No. 672,966. Patented Apr. 30, 1901.
W. A. SHELDON.
COMBINED EGG CASE AND TRAY.
(Application filed Feb. 28, 1900.)
(No Model.) 3 Sheets—Sheet 1.
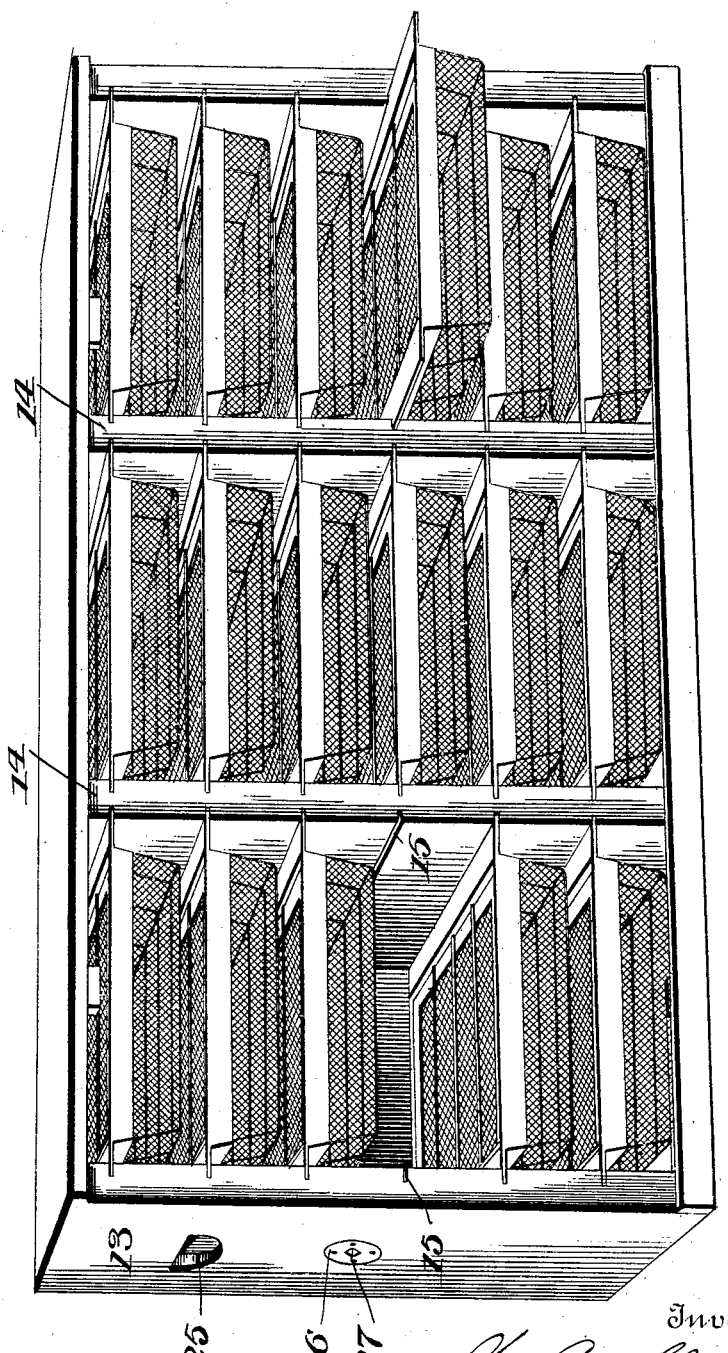

No. 672,966. Patented Apr. 30, 1901.
W. A. SHELDON.
COMBINED EGG CASE AND TRAY.
(Application filed Feb. 28, 1900.)
(No Model.) 3 Sheets—Sheet 2.
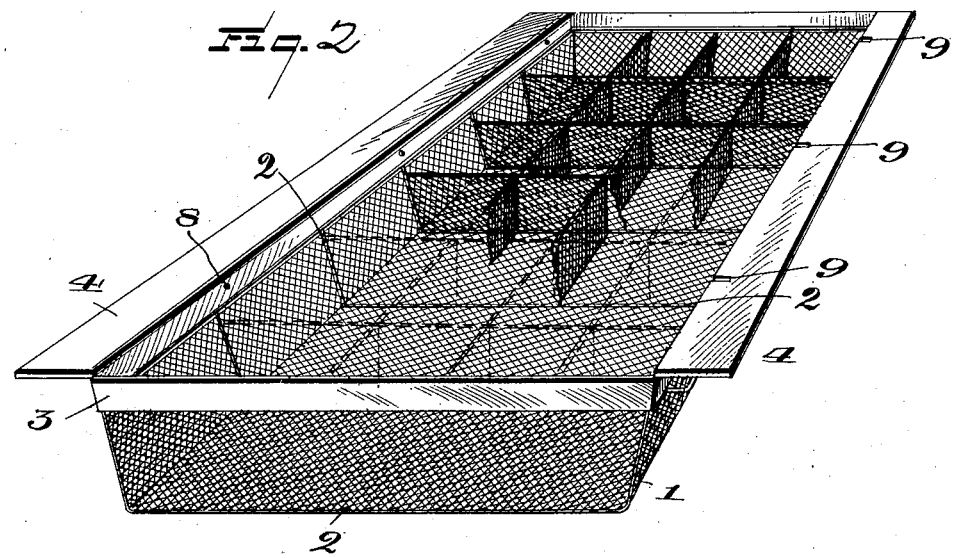
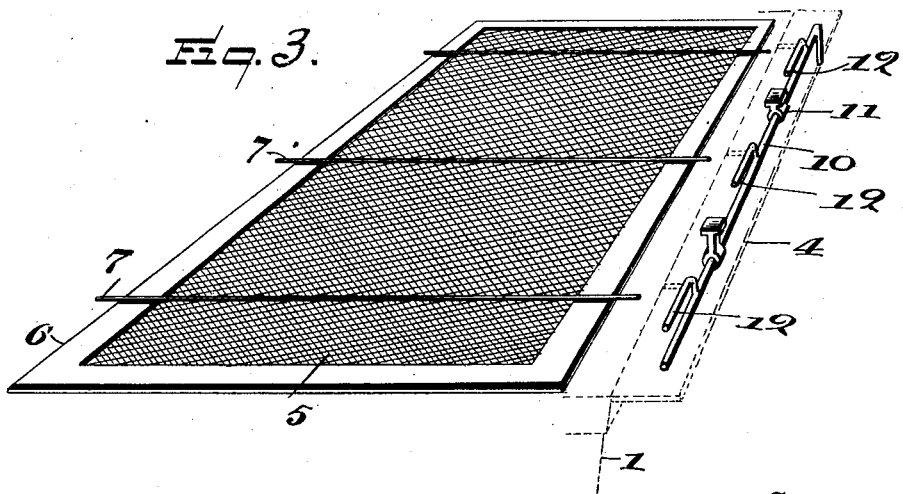

No. 672,966. Patented Apr. 30, 1901.
W. A. SHELDON.
COMBINED EGG CASE AND TRAY.
(Application filed Feb. 28, 1900.)
(No Model.) 3 Sheets—Sheet 3.
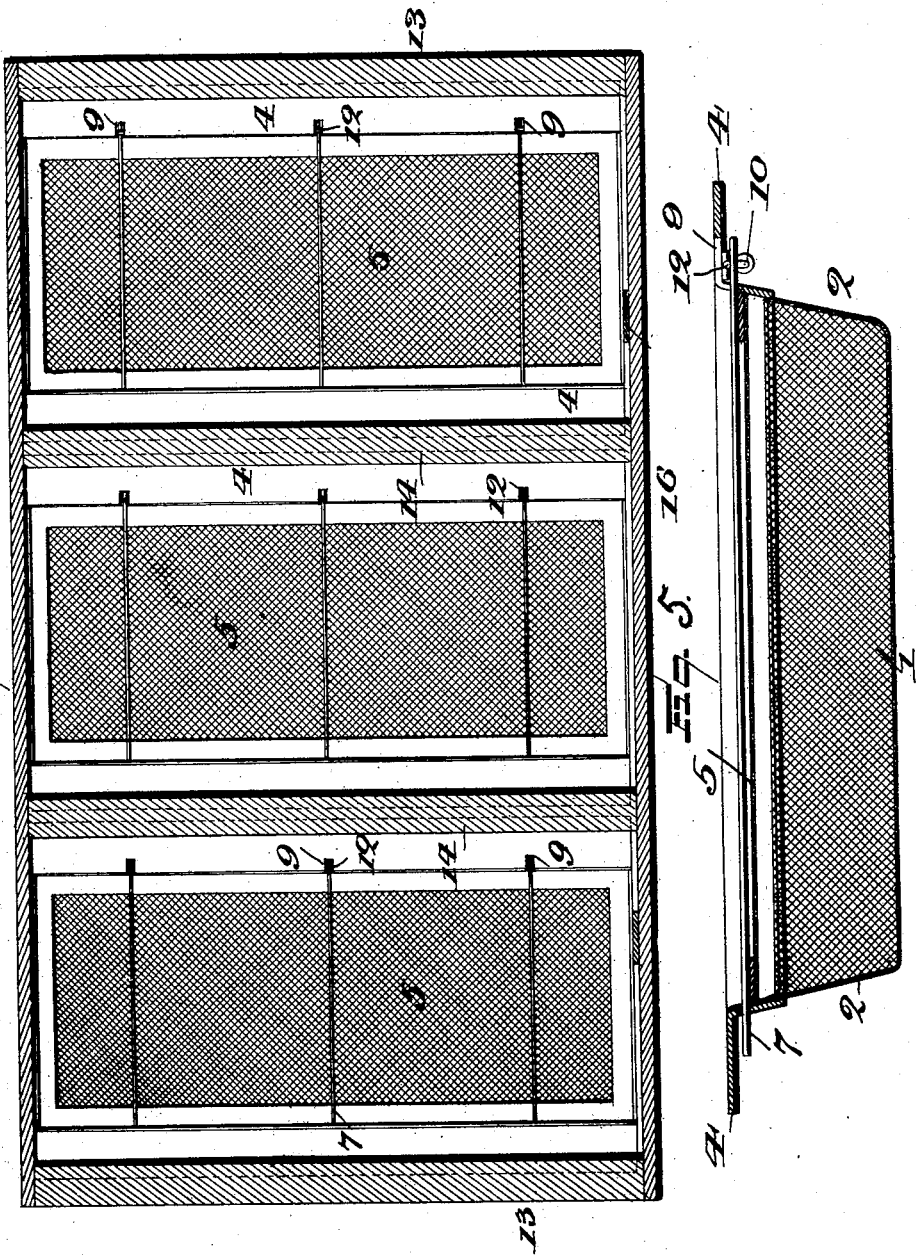
Witnesses
L. C. Hills.
Chester A. Baker.
Inventor
Wm. A. Sheldon,
by W. Harrison,
Attorney.

UNITED STATES PATENT OFFICE.

WILLIAM A. SHELDON, OF BELVIDERE, ILLINOIS.

COMBINED EGG CASE AND TRAY.

SPECIFICATION forming part of Letters Patent No. 672,966, dated April 30, 1901.

Application filed February 28, 1900. Serial No. 6,823. (No model.)

*To all whom it may concern:*

Be it known that I, WILLIAM A. SHELDON, a citizen of the United States, residing at Belvidere, in the county of Boone and State of Illinois, have invented certain new and useful Improvements in a Combined Egg-Case and Egg-Tray; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to crates for holding fruit, eggs, and other commodities in storage and in shipment and to cases for containing the crates while such use is being made of them.

It has for its object to so construct the cases that each case will receive any desired number of crates and have the crates supported therein so that no one crate will rest upon another and in such manner that any one or more of the crates may be removed and replaced without disturbing the other crates contained within the case.

It has further for its object to form the crates of soft and flexible wire cloth or gauze material strengthened throughout by heavier wires or strands interwoven with the soft and flexible strands, so as to prevent the soft and flexible fabric from sagging to an extent that would seriously impair its usefulness for the purpose, the trays being made of such depth as to receive a single layer of the fruit or eggs, with the top and bottom of the tray made of such soft and flexible fabric bearing against the upper and under sides of the fruit or eggs as to hold the same against movement and yet without injury to the fruit or eggs.

It has further for its object to form the soft and flexible fabric with the heavier wires or strands so located that they will lie in line with or register with the strips composing the fillings for the trays, and thus prevent the fruit or eggs from resting upon the heavier wires or strands for the purpose of preventing injury to the fruit or eggs or other commodities which might result if they were permitted to come in contact with the heavier wires or strands.

It has also for its object to so form the fabric having such heavier wires or strands that when the fabric is bent or formed into shape to constitute the tray the heavier wires or strands will not only extend across the bottom of the tray, but also up along the sides of the tray, and also preferably constitute a selvage edge to the top of the opposite ends of the tray; and it has further for its object to otherwise improve the formation of the trays and of the case to contain the same, as may be made hereinafter to appear.

To the accomplishment of the foregoing and such other objects as may be made to appear the invention consists in the construction and also in the combination of parts hereinafter particularly described and then sought to be specifically defined by the claims, reference being had to the accompanying drawings, forming part hereof, and in which—

Figure 1 is a perspective of a case containing a number of the trays, one tray being partially withdrawn, another tray being entirely removed, and the cover to the case being omitted. Fig. 2 is a perspective of one of the trays with its top removed. Fig. 3 is a perspective of a tray-top and of the means for locking it to the tray, a portion of the tray being shown in dotted lines. Fig. 4 is a horizontal section through the case, showing three of the trays in plan; and Fig. 5 is a vertical cross-section through one of the trays with its top locked in position.

In the drawings the numeral 1 designates the tray, the body of which is formed of wire cloth or gauze made of soft and flexible strands of wire, so as to do no damage to the fruit or eggs or other commodity when the cloth is pressed against opposite sides of the fruit or eggs for the purpose of holding the latter firmly against movement. For the purpose of preventing this wire-cloth from unduly sagging the same has woven as a part thereof the wires or strands 2, which are considerably heavier or stouter than the other strands of the cloth and which are represented as extending in one direction, the cloth being woven in strips and of the width desired to constitute the length of the tray when the cloth is bent or formed into shape to constitute the bottom and sides of the tray. For this purpose the heavier strands or wires are woven into the cloth so as to extend lengthwise of the strip or roll of cloth, the two outer strands constituting a selvage edge to the strip of cloth. With the cloth so formed the desired length is cut from the roll and its sides and ends turned or bent up so as to form the sides and ends of the tray, the heavier strands or wires when the cloth is bent into shape extending across the bottom and up the two opposite sides of the tray, while the opposite ends of the tray have at their top edges the outside strands to the strip of cloth which constitute selvage edges to the ends of the tray, and the upper edges of the sides and ends of the tray are then provided with a strengthening border-frame 3, which is formed of either wood or metal and has the wire-cloth secured thereto by staples or by soldering, according as the border-frame is made of wood or metal, and the sides of the border-frame are provided with laterally-extending flanges 4, which serve to support the tray in the case provided therefor, as will be hereinafter described. The heavier wires or strands 2 are so spaced apart that they will register with or lie in line with the fillings for the trays, which fillings may be of the ordinary form commonly used in trays for shipping eggs and fruits. By bringing the heavier wires or strands in line with the strips constituting the fillings the fruit or eggs are caused to rest upon the soft and flexible wire or cloth between the heavier strands, and are thus prevented from being injured by contact with the heavier strands, which strands serve to strengthen and brace the otherwise light cloth and to prevent undue sagging of the cloth when the tray is filled with fruit or eggs or other commodities.

The tray is provided with a wire cloth or gauze top 5, made from soft and flexible wire, like the light wire of the body of the tray, said top being provided with the border-frame 6, and which top may be hinged or otherwise secured to the tray, although the novel manner of securing the top to the tray under the present invention is by means of heavy wires or rods 7, which will extend across the cloth or netting of the top and be interlocked with the meshes thereof or suitably secured to the border-frame of the top, the ends of the rods extending beyond the border-frame, so that on one side the projecting ends may enter apertures 8, formed in the border-frame of the tray-body at one side, the projecting ends of the rods at the opposite side of the top dropping into slots or recesses 9, formed in the border-frame and the projecting flange of the tray at that side, so as to lie beneath the flange, in order that the projecting ends of the rods may be engaged by a locking-bolt 10, which slides in suitable guides or hangers 11, secured to the under side of the projecting flange of the tray at that side, said locking-bolt being provided with fingers 12, adapted to slide over the projecting ends of the rods 7 when the bolt is moved into locking position, thus locking the top to the tray. The rods 7 will be so positioned that they will lie over the strips constituting the filling for the tray, so that they will not come in contact with the fruit or eggs in the tray and will thus be prevented from injuring the fruit or eggs.

The tray is made of such depth that when it is filled with fruit or eggs and the top is placed in position the soft wire cloth of the top and of the bottom of the tray will press closely against the fruit or eggs, so as to hold the same in position and prevent them from moving, the softness of the wire yielding sufficiently to such pressure as to prevent damage to the fruit or eggs, and the depth of the fillings to the tray is made slightly less than the depth of the tray, so as not to interfere with the proper pressure of the soft wire cloth of the top against the fruit or eggs. I have not illustrated the fillings in the tray, for the reason that such fillings, which are ordinarily made of pasteboard and in the form of cells, are well known in the art of egg trays or carriers, and therefore need not be illustrated in detail.

The trays are made of such depth as to receive only a single layer of fruit or eggs, so that no one fruit or egg will rest upon another.

Under the construction of tray described if it is desired to have access to the contents of the tray it is simply necessary to shift the locking-bolt 10 and then lift that side of the top, the projecting ends of the rods which enter the apertures 8 in the opposite sides of the border-frame to the tray allowing that side of the top to move as upon a hinge, and when the top is so opened any one or more of the fruits or eggs can be removed for any purpose desired. Besides the advantages already specified for this construction of tray another advantage is that when it is desired to "candle" eggs it can be done most satisfactorily by simply sliding the tray out of its case and holding it up in the proper light, when each egg of the entire number contained within the tray can be "candled" without removing any egg from the tray, the whole tray of eggs being candled by the simple manipulation of the tray in the proper light, owing to the fine wire and mesh of the cloth constituting the side, bottom, and top of the tray, the eggs within the tray not being disturbed in position in the least, owing to their being held firmly by the cloth wire constituting the cloth from which the tray is made, and if any one egg is found to be bad it can be removed and replaced by a good one without disturbing the other eggs in the tray, and owing to the eggs being held firmly but softly between the yielding surfaces of the wire-cloth constituting the top and body of the tray the eggs are protected against such jolting or jarring during transportation as would otherwise break the eggs or damage the fruit. The feature of enabling the eggs to be candled, as specified, by viewing the same from one face or the other of the tray is an important one and its value appreciated by the owners of large storage plants.

For the purpose of properly supporting the trays and preventing one from contacting with another during storage and transportation a specially-devised case is provided and is illustrated in Fig. 1 of the drawings, which shows the trays in position in the case, the walls and partitions of the case in said figure being illustrated on an enlarged scale for the purpose of clearness, although in practice the walls and timbers will be of comparatively light material, which can be used in view of the strength given to the case by reason of its features of construction. In illustration of this case the numeral 13 designates the case, which is provided with vertical partitions 14, which, together with the end walls of the case, serve to support the series of crates within the case. If the crates are formed, as preferred, with the lateral side flanges 4, these flanges will fit and slide in grooves 15, formed in the partitions and the end walls of the case, as illustrated, so that the trays can be easily moved in and out of the case, the crates being placed in tiers in the case one above the other, the grooves being so located that each tray will be supported independently of the others and be free from contact with one another, as clearly illustrated in Fig. 1 of the drawings. If the border-frame to the tray be made of wood, as previously indicated, ledges may be formed on the end walls and partitions, so as to receive the border-frames, said frames resting upon said ledges by contact between their lower casing and the upper faces of the ledges, and in that event the lateral projecting flanges may be omitted from the trays; but the flanges and the grooves are the preferred construction. The case is provided with a removable side or cover, so that the trays may be inserted and withdrawn, said cover being designated by the numeral 16. The ends of the case will be formed with recesses 25 for the purpose of lifting the case, and plates 26 will be set into the ends of the case and formed with an angular opening 27, designed to receive pintles or journals, so that the case may by such pintles or journals be supported upon suitable tracks or ways when the case of trays is to be used in connection with means for imparting motion thereto during storage or transportation, as is done in some instances and which is familiar to those skilled in the art. In the drawings the walls to the case are illustrated as made solid; but it is to be understood that they may be made up of separate strips or boards with spaces between, so as to permit a free circulation of air through the case; but this is not illustrated, as the same is not specifically claimed and it will be obvious from the statements just made.

I have illustrated and described what I consider to be the best details of construction for the several parts; but it is obvious that changes can be made and the essential features of my invention still be retained. It is to be understood that it is contemplated making the cover or top to the tray of the same specially-formed wire-netting of which the body of the tray is formed.

Having described my invention and set forth its merits, what I claim is—

1. A tray for eggs and other articles having its body portion formed of an open-mesh soft and pliable material provided with relatively heavier strands extending across the material for strengthening and bracing the same, a cover to the tray formed of open-mesh material, and means for securing the cover to the tray, the depth of the tray being such as to receive a single layer of the eggs or other articles and cause the soft fabric of the top and bottom of the tray to hold the articles between the top and bottom by a yielding pressure, substantially as described.

2. A tray for eggs and other articles having its body portion formed of a light open-mesh wire-cloth provided with relatively heavier strands interwoven therewith at fixed distances apart across the material, a light open-mesh wire-cloth cover to the tray, and means for securing the cover to the body portion, the depth of the tray being such as to receive a single layer of the eggs or other articles and cause the soft fabric of the top and bottom of the tray to hold the articles between the top and bottom by a yielding pressure, substantially as described.

3. A tray for eggs and other articles having the body portion formed of light open-mesh material and provided with relatively larger strands extending across the bottom and up the sides of the body portion for bracing and strengthening the same, said relatively larger strands being spaced at fixed distances apart corresponding to the partitions in a cell-filling for the tray whereby said partitions will protect the eggs and other articles against injury by the large strands, a cover to the body portion, and means for securing the cover thereto, substantially as described.

4. A tray for eggs and other articles having the body and cover formed of a light open-mesh material, said body and cover portions having relatively heavier strands extending across the same at fixed distances apart to brace and strengthen the body and cover, said relatively larger strands of both body and cover being spaced at fixed distances apart corresponding to partitions in a cell-filling for the tray whereby said partitions will protect the eggs and other articles against injury by the large strands, substantially as described.

5. A tray for eggs and other articles having the body portion formed of a light open-mesh material provided with relatively heavier strands at fixed distances apart across the bottom and sides, a border-frame extending around the frame, side flanges extending laterally from the opposite sides of the frame, a portion of the tray on one side formed with apertures and a portion on the opposite side formed with slots or recesses, a top cover for the tray formed of light open-mesh material having projections from opposite sides, one set of the projections adapted to enter the apertures in the side of the tray and the other set of projections adapted to pass through the slots or recesses, and means for engaging one set of the projections to lock the top in place, substantially as described.

6. A tray for eggs and other articles having the body portion formed of light open-mesh material provided with relatively heavier strands at fixed distances apart to strengthen and brace the material, a top cover to the tray provided with projections adapted to extend beyond one side of the tray, and a bolt provided with fingers to engage said projections to hold the cover in place, substantially as described.

7. The carrier for eggs, fruit and other articles consisting of a case having angular sockets formed in its sides to receive journal-pins to adapt the case to be turned during storage and transportation and formed on the inside to receive and support a number of trays out of contact with each other, and trays for supporting inside the case the eggs or other articles to be stored and transported, said trays having flexible bottoms and covers by and between which the articles may be held by a yielding pressure against movement in the trays during transportation and turning of the case, substantially as described.

In testimony whereof I affix my signature in presence of two witnesses.

WILLIAM A. SHELDON.

Witnesses:
  H. G. OTIS,
  AMOS I. BININGTON.